(12) United States Patent
Wink et al.

(10) Patent No.: US 9,228,477 B2
(45) Date of Patent: Jan. 5, 2016

(54) EXHAUST SYSTEM HAVING A SYSTEM FOR REMOVING CONDENSATE

(71) Applicant: Eberspächer Exhaust Technology GmbH & Co. KG, Neunkirchen (DE)

(72) Inventors: Peter Wink, Goeppingen (DE); Michael Pommerer, Uhingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 14/472,949

(22) Filed: Aug. 29, 2014

(65) Prior Publication Data

US 2015/0060192 A1    Mar. 5, 2015

(30) Foreign Application Priority Data

Aug. 30, 2013 (DE) .................. 10 2013 109 462

(51) Int. Cl.
  *F01N 13/16*  (2010.01)
  *F01N 13/08*  (2010.01)
  *F01N 1/06*   (2006.01)
  *F01N 3/00*   (2006.01)

(52) U.S. Cl.
  CPC ............. *F01N 13/08* (2013.01); *F01N 1/065* (2013.01); *F01N 3/005* (2013.01); *F01N 2470/30* (2013.01)

(58) Field of Classification Search
  CPC ....................................... F01N 13/16
  USPC ..................................... 181/245
  See application file for complete search history.

(56) References Cited

U.S. PATENT DOCUMENTS 7,263,826 B2 *  9/2007  Wu ................................ 60/299
2011/0192152 A1  8/2011  Wirth

FOREIGN PATENT DOCUMENTS

| DE | 29 14 159 B1 | 10/1980 |
|---|---|---|
| DE | 10 2008 034 911 A1 | 3/2010 |
| DE | 10 2011 089 283 A1 | 6/2013 |
| GB | 2 134 979 A | 8/1984 |
| JP | S59-165819 A | 9/1984 |
| JP | H03-071123 U | 7/1991 |
| JP | H10-232683 A | 9/1998 |
| WO | 2011/095412 A1 | 8/2011 |

OTHER PUBLICATIONS

"Venturi Effect": http://en.wikipedia.org/wiki/Venturi_effect.
Extended European Search Report of Jan. 23, 2015.
Japanese Office Action of Sep. 3, 2015.

* cited by examiner

*Primary Examiner* — Forrest M Phillips
(74) *Attorney, Agent, or Firm* — McGlew and Tuttle, P.C.

(57) ABSTRACT

An exhaust system, for a vehicle driven by an internal combustion engine, has a system for removing condensate (141) that includes a first line section (110) for fluid connection with exhaust gas (160), at least one second line section (120) for fluid connection with exhaust gas (160), and at least one suction line (130; 131; 132; 136; 137; 138). The suction line (130; 131; 132; 136; 137; 138) is disposed between the bottom (124) of the at least one second line section (120) and the first line section (110), and includes an opening (135) configured to be passed over by exhaust gas (160) passing through the first line section (110).

20 Claims, 4 Drawing Sheets

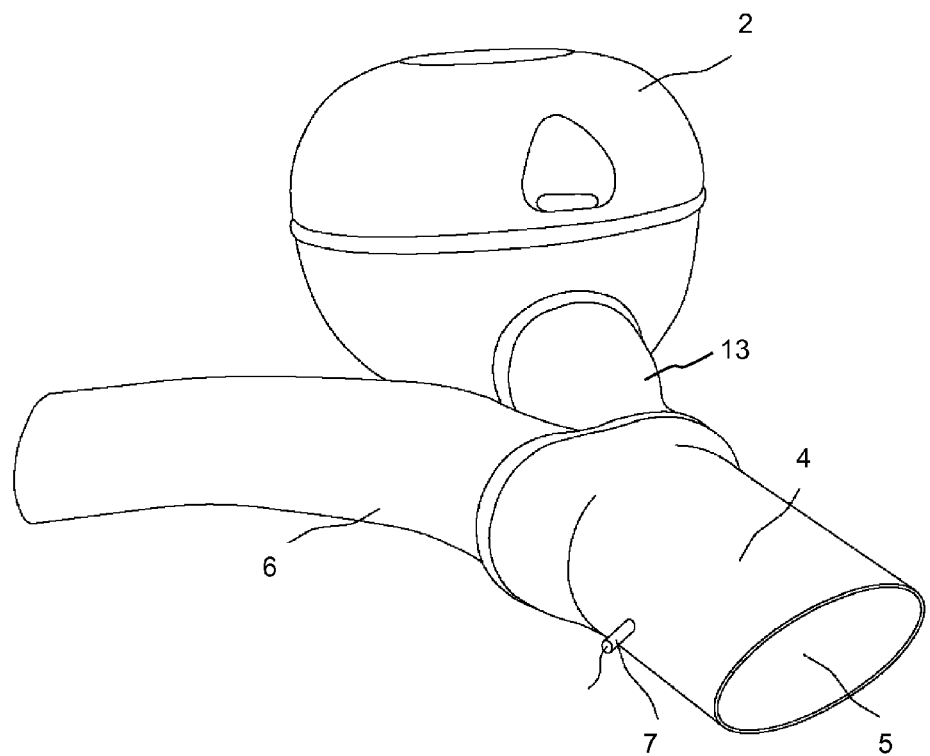
Figure 1A - prior art
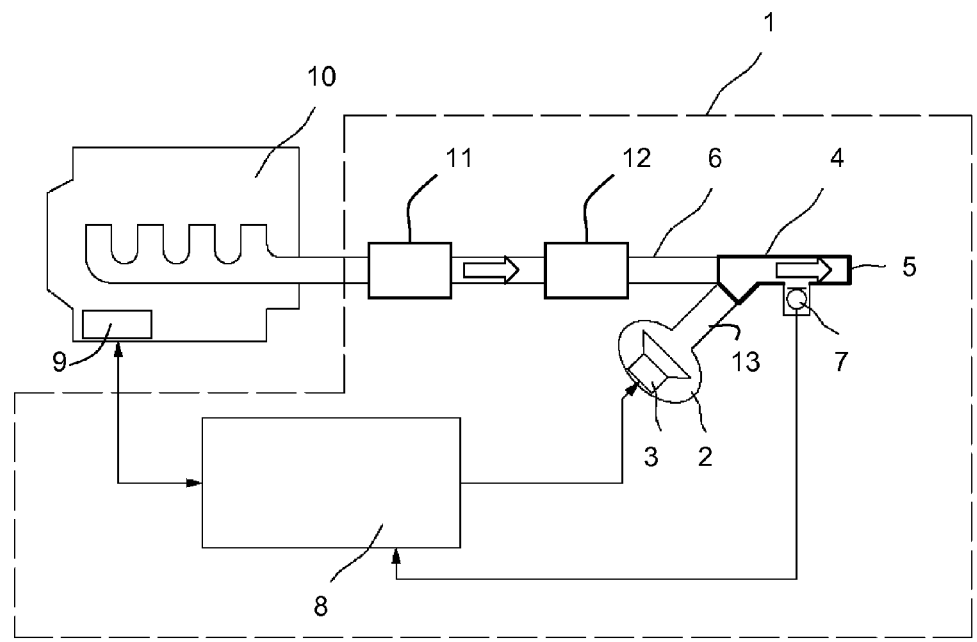
Figure 1B - prior art

EXHAUST SYSTEM HAVING A SYSTEM FOR REMOVING CONDENSATE

CROSS REFERENCE TO RELATED APPLICATIONS

This present application claims priority of Patent Application No. 10 2013 109 462.7, filed Aug. 30, 2013 in Germany, the entire contents of which are incorporated by reference herein.

FIELD OF THE INVENTION

The invention relates to an exhaust system for a motor vehicle driven by an internal combustion engine having a system for removing condensate.

BACKGROUND OF THE INVENTION

Exhaust system are conventionally constructed with passive components, with the exhaust gas flowing through all of them in all operating situations, and with the components together forming the exhaust system. Aside from exhaust gas lines, these components may be a turbocharger, a catalytic converter or a muffler, for example.

In recent times, systems to actively manipulate exhaust noise caused by operating an internal combustion engine and propagating through an exhaust system have been added to such exhaust systems. Such systems impart a characteristic noise to the exhaust noise generated by the internal combustion engine and propagating through the exhaust system. The imparted characteristic noise shall fit the image of a respective manufacturer and be popular with customers. Sound waves produced artificially inside the exhaust system are for this purpose superposed onto sound waves originating in the operation of the internal combustion engine and propagating through the exhaust system (exhaust noises).

This is achieved by providing a sound generator that is in fluid communication with the exhaust system and introduces sound into the interior of the exhaust system. The artificially produced sound is mixed with the sound produced by the internal combustion engine before they exit together through the tailpipe of the exhaust system. Systems of this kind may also be used for sound attenuation. To achieve a complete destructive interference between the exhaust noise sound waves propagating through the exhaust system and the sound produced by the sound generator, the sound waves originating from the loud speaker have to match the sound waves propagating through the exhaust system in magnitude and frequency and show a relative phase shift of 180 degrees. If the anti-noise sound waves generated at the loudspeaker match the sound waves propagating through the exhaust system in frequency and have a phase shift of 180 degrees relative thereto, but do not match the sound waves in amplitude, only an attenuation of the sound waves of the exhaust noise propagating through the exhaust system results.

A respective exhaust system according to the state of the art is described below referencing FIGS. 1A and 1B:

An exhaust system featuring a sound system 1 comprises a sound generator 2 in the form of a soundproofed housing containing a loudspeaker 3 and being connected to an exhaust system 6 in the region of a tailpipe 4 via a sound line 13. Referencing FIG. 1A, a bottom of the sound generator 2 and a bottom of the sound line 13 are disposed above a bottom of the tailpipe 4. The tailpipe 4 has a discharge opening 5 for discharging exhaust gas passing through the exhaust system 6. An error microphone 7 in the form of a pressure sensor is provided at the tailpipe 4. The error microphone 7 measures the pressure variations and thus the noise inside the tailpipe 4 in a section downstream of a region where the sound line 13 enters the exhaust system 6. The region where the sound line 13 enters the exhaust system 6 provides a fluid connection between the exhaust system 6 and the sound generator 2. The term "downstream" hereby relates to the direction of the exhaust gas flow. The direction of the exhaust gas flow is indicated by arrows in FIG. 1B. Between the internal combustion engine 10 and the region providing the fluid connection between the exhaust system 6 and the sound generator 2, a catalytic converter 11 and a muffler 12 are also provided. The loudspeaker 3 and the error microphones 7 are electrically connected to a controller 8. Further, the controller 8 is connected to an engine control unit 9 of an internal combustion engine 10 via a CAN data bus. The controller 8 calculates a control signal for the loudspeaker 3 based on the sound measured with the error microphone 7 and based on the operating parameters of the internal combustion engine 10 received via the CAN data bus in a way that the control signal is adapted to cause a desired overall sound when superposing with the sound propagating inside the exhaust system 6, and outputs the control signal to the loudspeaker 3. The controller may hereto use for instance a Filtered-x Least Means Squares (FxLMS) algorithm, and may try to turn an error signal measured with the error microphone down to zero (in the case of sound cancellation), or to a preset threshold (in the case of sound manipulation) by outputting sound using the loudspeaker.

There is a disadvantage with conventional exhaust systems that corrosive condensate may form and accumulate in the sound generator, sound line or other components of the exhaust system like the catalytic converter or the muffler. The sound generator as well as the sound line are particularly prone to a formation of condensate, since they are usually colder than those components of the exhaust system passed through by hot exhaust gas. Furthermore, the flow rate of the exhaust gas in the sound line and the sound generator is almost zero.

With an accumulation of corrosive condensate in the sound generator or another component of the exhaust system there is a risk of destroying at least one of the sound generator and the sound line and the other component from inside to outside.

To solve this problem, it is known to arrange critical components like sound generator and sound line at a raised level with respect to the exhaust system so that the condensate is enabled to drain. This is also illustrated in the example of FIG. 1A. The possibilities of arranging the sound generator with respect to the exhaust system are hereby considerably limited.

In addition it is known to provide openings on the bottom face of components of the exhaust system, allowing the condensate to drain. Respective openings are, however, only permitted to a very limited degree, since in addition to the condensate also non-treated exhaust gas may escape. Furthermore, the edges of such openings are themselves particularly susceptible to corrosion.

SUMMARY OF THE INVENTION

Embodiments provide an exhaust system for vehicles driven by an internal combustion engine having a system for draining condensate, the system being of low complexity and very robust, thus enabling a production of the system at low cost.

Embodiments of an exhaust system for a vehicle driven by an internal combustion engine having a system for draining condensate comprise a first line section for fluid connection with exhaust gas, at least a second line section for fluid connection with exhaust gas, and at least one suction line. "For fluid connection with exhaust gas" hereby means that in operation the exhaust gas is in contact with the interior wall of the line section, but it is not required that the exhaust gas flows through all or even a portion of the line section. An alternative wording may be "suppliable with exhaust gas" or "for fluid communication with exhaust gas". The suction line is disposed between the bottom of the at least one second line section and the first line section. The suction line includes a suction opening configured to have exhaust gas flowing through the first line section flow over the suction opening. The exhaust gas flowing over the suction opening entails that the opening of the suction line is located within the first line section and that exhaust gas flowing through the first line section flows past the opening. The opening of the suction line is hereby adequately located in a wall of the first line section.

The exhaust gas flowing past the opening formed in the suction line generates a negative pressure in the suction line enabling a transportation of condensate accumulated at the bottom of the at least one second line section through the suction line into the first line section and to drain it together with the hot exhaust gas. In this way it is possible to transport condensate from line sections located at lower levels to line sections located at higher levels by using only passive components and without the use of a drain opening in the at least one second line section. Similarly it is possible to drain condensate from line sections at higher levels to line sections at lower levels or from line sections located at the same level, when a line section at still higher levels prevents the condensate from being drained naturally.

According to an embodiment, the condensate transported from the at least one second line to the first line is evaporated in the first line due to the high temperature of the exhaust gas and discharged in gaseous state together with the exhaust gas.

According to an embodiment, the suction line is a tube provided in addition to the first line section and the at least one second line section. Alternatively, the suction line may for instance also be formed integrally with the at least one second line section, e.g. by inserting a metal sheet. Further alternatively, the suction line may be a flexible line provided it is sufficiently resistant to pressure.

According to an embodiment, the suction line is formed in one piece from metal or synthetic material.

According to an embodiment, the suction line comprises exactly two openings located opposite to each other with respect to the longitudinal extension of the suction line. According to an embodiment, a first opening of the suction line is located within the first line to have exhaust gas flowing though it, and a second opening of the suction line is located at the bottom of the second line.

According to an embodiment, the suction line has a longitudinal extension being at least 5 times, and in particular at least 10 times, and further in particular at least 20 times a largest diameter of the suction line at the opening located in the first line section.

According to embodiments, the suction line has a longitudinal extension being at least 3 times, and in particular 6.5 times, and further in particular at least 13 times of the square root of a cross-sectional area of the suction line at the opening located in the first line section.

According to an embodiment, the cross-section of the first line section at the position where the suction line enters the first line section is smaller than a cross-section of the first line section upstream of the position where the suction line enters the first line section. Due to this cross-sectional variation, a negative pressure occurs in the first line section at the position where the suction line enters the first line section. The relevant mechanism of action is hereby that of a Venturi nozzle. The decrease of the first line section's cross-section may hereby be effected by separate measures or by placing the suction line or part of the suction line inside of the first line section.

According to an embodiment, the terms "upstream" and "downstream" are defined in accordance with a flow direction of exhaust gas in the first line section, respectively. Thus, downstream means a direction in flow direction and upstream a direction against flow direction of the exhaust gas.

According to an embodiment, the cross-section of the first line section at the position, where the suction line enters the first line section, is decreased by at least 5%, and in particular by at least 10%, and further in particular by at least 20% with respect to the cross-section of the first line section upstream of the position, where the suction line enters the first line section.

According to an embodiment, the position, where the suction line enters the first line section, is spaced apart in a direction against the flow direction of the exhaust gas from the position of the first line section, where the first line section has a larger cross-section than at the position where the suction line enters the first line section, by not more than two times the square root of the cross-sectional area, and in particular by the square root of the cross-sectional area, and further in particular by not more than half of the square root of the cross-sectional area of the first line section at the position, where the suction line enters the first line section.

According to an embodiment, the first line section has a largest diameter at the position, where the suction line enters the first line section, the largest diameter being smaller than a largest diameter upstream of the position, where the suction line enters the first line section. Due to this variation of the largest diameter, a negative pressure is present at the position where the suction line enters the first line section. The relevant mode of action corresponds to that of a Venturi nozzle. The decrease of the first line section's largest diameter may hereby be effected by separate measures or only by placing the suction line or part of the suction line inside the interior of the first line section.

According to an embodiment, the largest diameter of the first line section at the position, where the suction line enters the first line section, is reduced by at least 3%, and in particular at least 7%, and further in particular at least 14% in comparison to the largest diameter upstream of the position, where the suction line enters the first line section.

According to an embodiment, the position where the suction line enters the first line section is spaced apart against the flow direction of the exhaust gas from the position of the first line section, where the first line section has a larger cross-section than at the position, where the suction line enters the first line section, by not more than three times the largest diameter, and in particular by not more than one and a half of the largest diameter, and further in particular by not more than three quarter of the largest diameter of the first line section at the position, where the suction line enters the first line section.

According to an embodiment, the suction line has a cross-section being not more than 50% of the cross-section, and in particular not more than 30% of the cross-section, and further in particular not more than 10% of the cross-section of the first and/or the second line section.

According to an embodiment, the suction line has a largest diameter being not more than 33% of the largest diameter, and in particular not more than 20% of the largest diameter, and further in particular not more than 7% of the largest diameter of the first and/or second line section.

According to an embodiment, the at least one second line section comprises at least one sound generator configured to being connected to a controller for receiving control signals and to generate sound in the at least one second line section. Since the line section coupling the at least one sound generator to the exhaust system is usually only in contact with stagnant exhaust gas, this line section is usually colder than other line sections and thus particularly susceptible to corrosion.

According to an embodiment, the at least one second line section defines a constant volume.

According to an embodiment, the constant volume defined by the section line section ignores periodic volume changes. Such periodic volume changes may be caused by displacements of a membrane of at least one loudspeaker located in the at least one sound generator the second line section, for example.

According to an embodiment, at least in sections of the second line section the bottom of the second line section is located below a bottom of the first line section.

According to an embodiment, the first line section has a first end, enabling a fluid connection with an internal combustion engine, and a second end, enabling a fluid connection with an exhaust gas discharge opening (e.g. a tailpipe).

According to an embodiment, a pressure of an exhaust gas supplied to the first line section is equal or higher than a pressure of an exhaust gas supplied to the at least one second line section.

According to an embodiment, the second line section converges into the first line section.

According to an embodiment, the condensate is a liquid.

According to an embodiment, the suction line is provided in addition to the first line section and the second line section. Thus, the first line section, the second line section and the suction line are distinct elements.

Embodiments of a motor vehicle comprise an internal combustion engine having an engine controller and an exhaust system as described above. Hereby, one end of the first line section is in fluid communication with the internal combustion engine, and the other end of the first line section is in fluid communication with an exhaust gas discharge opening. When the internal combustion engine is in operation, an internal pressure caused by the exhaust gas from the internal combustion engine inside the first line section at a position where the suction line enters the first line section is reduced with respect to an internal pressure upstream of the position, where the suction line enters the first line section.

It is noted in this context that the terms "including", "comprising", "containing", "having" and "with", as well as grammatical modifications thereof used in this specification or the claims for listing features, are generally to be considered to specify a non-exhaustive listing of features like for instance method steps, components, ranges, dimensions or the like, and do by no means preclude the presence or addition of one or more other features or groups of other or additional features.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Further features of the invention will be apparent from the following description of exemplary embodiments together with the claims and the Figures. In the Figures, like or similar elements are indicated by like or similar reference signs. It is noted that the invention is not limited to the embodiments of the exemplary embodiments described, but is defined by the scope of the enclosed claims. In particular, embodiments according to the invention may implement individual features in a different number and combination than in the examples provided below. It is noted that not all possible embodiments necessarily exhibit each and every, or any, of the advantages identified herein.

In the following explanation of an exemplary embodiment of the invention, reference is made to the enclosed Figures, of which:

FIG. 1A is a schematic representation of a perspective view of a section of an exhaust system having a sound generator of a system for modifying exhaust noise from an internal combustion engine propagating through an exhaust system of a vehicle;

FIG. 1B is a schematic representation of a block diagram of a system for modifying exhaust noise from an internal combustion engine propagating through an exhaust system of a vehicle in cooperation with an exhaust system of an internal combustion engine according to the prior art, using the sound generator of FIG. 1A;

DESCRIPTION OF THE PREFERRED EMBODIMENTS

Figure 2A:
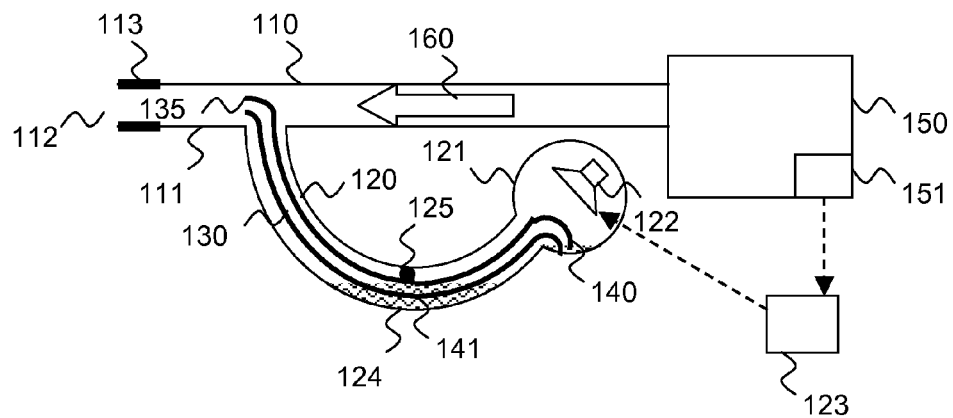
FIG. 2A is a schematic representation and block diagram of a system for modifying exhaust noise from an internal combustion engine propagating through an exhaust system of a vehicle according to a first of eight embodiments of the invention.

Referring to the drawings in particular, several embodiments according to the invention are explained with respect to the Figures. In the exemplary embodiments described below, components that are alike in function and structure are designated as far as possible by alike reference numerals. Therefore, to understand the features of the individual components of a specific embodiment, the descriptions of other embodiments and of the summary of the disclosure should be referred to.

Referencing FIGS. 2A to 2H, exhaust gas 160 generated in an internal combustion engine 150 passes through an exhaust gas line 110 of an exhaust system and is discharged through a discharge opening 112 of a tailpipe 113 into atmosphere (surroundings). The direction of flow of the exhaust gas 160 is indicated by an arrow.

Between the internal combustion engine 150 and the tailpipe 113, the exhaust gas line 110 may optionally pass through one or more additional components like a turbocharger, a catalytic converter and/or a muffler. Only the schematic representation of FIG. 1B shows these components. It is further noted that more than one exhaust tract may be present.

According to the embodiments of all FIGS. 2A to 2H, the exhaust system further comprises a sound generator 121 with a soundproofed enclosure sealed against external influences and made from sheet metal for accommodating a loudspeaker 122. The sound generator 121 comprises a sound line 120 which couples the sound generated in the sound generator 121 into the interior of the exhaust gas line 110. The sound line 120 and the exhaust gas line 110 are in fluid communication for this purpose. Thus, fluid can flow from the sound line 120 to the exhaust gas line 110 and vice versa. The loudspeaker 122 is electrically connected to a controller 123. The controller 123 outputs an electrical signal transformed into sound by loudspeaker 122. The controller 123 is electrically coupled to an engine control unit 151 of the internal combustion engine 150 via a CAN data bus, and receives from the engine control unit 151 engine parameters, namely the currently valid engine speed and torque. The controller 123 uses the engine parameters for generating the electrical signal in order to match the sound generated by the loudspeaker 122 with a current operating condition of the internal combustion engine 150. It is noted that also a different vehicle bus may be used instead of a CAN data bus, in particular a LIN data bus, a MOST data bus or a FlexRay data bus, for example. Further, other, additional, or no engine parameters may be used. In the embodiment shown in FIGS. 2A to 2H, the bottom 124 of the sound line 120 is located at a lower level than a bottom 111 of the exhaust gas line allowing condensate 141 to accumulate on the bottom 124 of the sound line 120. Although a bottom of the sound generator 121 is located at a higher level than a bottom 124 of the sound line 120, a higher level bottom section is located between the lowest level bottom section of the sound generator 121 and the sound line 120, resulting in the condensate 140 formed in the sound generator 121 not being able to completely drain into the sound line 120 but accumulating at the lowest level bottom section of the sound generator 121 instead.

According to the embodiment of FIG. 2A, a suction line 130 is disposed inside the sound line 120. In the embodiment illustrated, the suction line 130 is made from synthetic material and retained by a spacer 125 such that the suction line 130 is disposed axially centered in the sound line 120. The suction line 130 comprises an opening at each of its two ends. An opening of the suction line 130 is arranged at the bottom of the sound generator 121 to immerse in a condensate 140 accumulating at the lowest level bottom of the sound generator 121. The other end of the suction line 130 comprises a discharge opening 135 arranged axially centered in the exhaust gas line 110 and being aligned along the exhaust gas' 160 direction of flow.

The axially centered disposal of the suction line 130 inside the exhaust gas line results in a narrowing of the clear cross-section of the exhaust gas line 110. A Venturi effect develops causing the exhaust gas 160 passing through the exhaust gas line 110 to generate a dynamic pressure upstream of the suction line 130 and thus a negative pressure downstream of the suction line 130 in the region of the discharge opening 135 of the suction line. The negative pressure sucks the condensate 140 accumulated in the sound generator 121 and outputs the condensate 140 into the exhaust gas line 110.

Figure 2B:
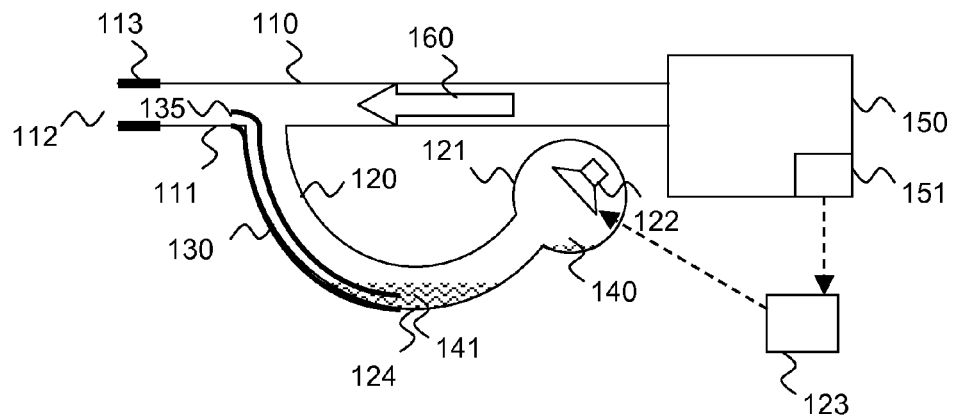
FIG. 2B is a schematic representation and block diagram of a system for modifying exhaust noise from an internal combustion engine propagating through an exhaust system of a vehicle according to a second of eight embodiments of the invention.

The embodiment of FIG. 2B differs from the embodiment from FIG. 2A by the suction line 130 not being disposed axially centered inside the sound line 120, but positioned in contact with the bottom of the sound line 120. In the embodiment shown, the suction line 130 is not an element formed separate from the sound line 120, but is formed by separating a segment from the sound line using a sheet metal. The spacer 125 can therefore be spared. Accordingly, also the discharge opening 135 of the suction line 130 is not disposed in the exhaust gas line 110 in an axially centered manner, but positioned at the bottom 111 of the exhaust gas line 110. In the embodiment of FIG. 2B, the opening of the suction line 130 is not disposed at the bottom of the sound generator 121, but in the region of the lowest level bottom 124 of the sound line 120 for enabling an immersion into condensate 141 accumulated at the lowest level bottom 124 of the sound line 120.

Due to the arrangement of the suction line 130 inside the exhaust gas line 110, also in this case a Venturi effect develops, that sucks the condensate 141 via the suction line into the exhaust gas line 140.

Figure 2C:
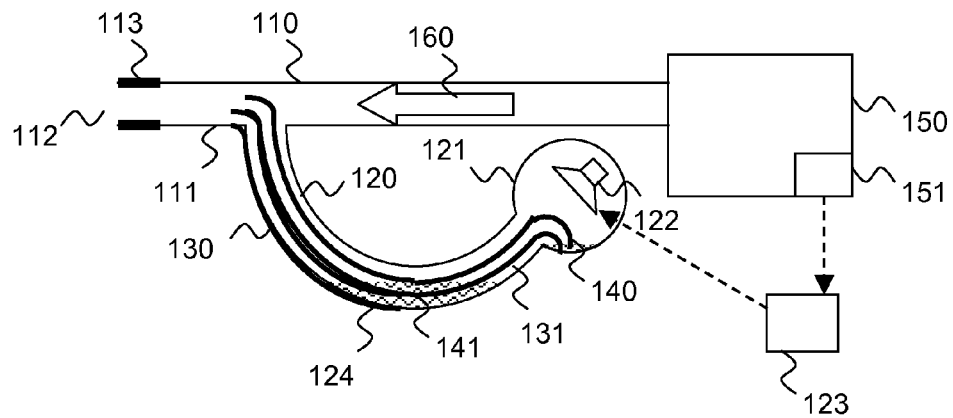
FIG. 2C is a schematic representation and block diagram of a system for modifying exhaust noise from an internal combustion engine propagating through an exhaust system of a vehicle according to a third of eight embodiments of the invention.

The embodiment of FIG. 2C differs from the embodiments of FIGS. 2A and 2B in that two suction lines 130, 131 are provided, of which one suction line 131 sucks condensate 140 from the lowest level bottom of the sound generator 121 and one suction line 130 sucks condensate 141 from the lowest level bottom 124 of the sound line 120 and into the exhaust gas line 110. The suction lines 130, 131 may hereby support each other allowing to spare the spacer 125 of FIG. 2A.

Figure 2D:
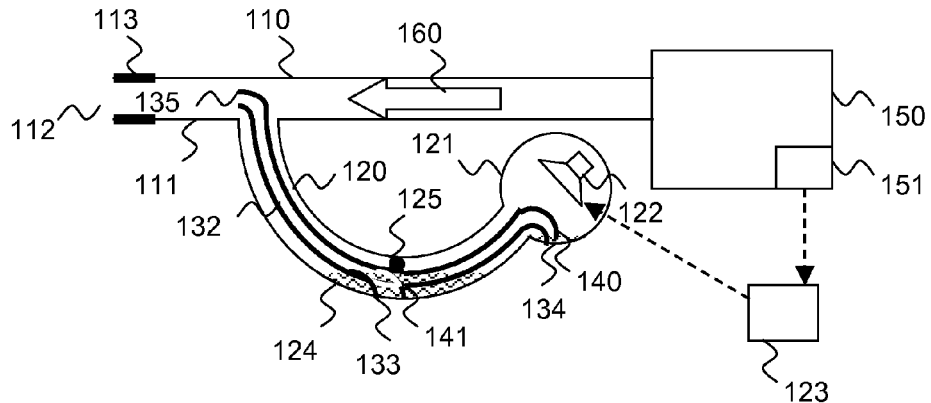
FIG. 2D is a schematic representation and block diagram of a system for modifying exhaust noise from an internal combustion engine propagating through an exhaust system of a vehicle according to a fourth of eight embodiments of the invention.

The embodiment of FIG. 2D differs from the embodiment of FIG. 2C in that a single suction line 132 comprising two suction openings 133, 134 is provided instead of two separate suction lines 130, 131, with one of the suction openings 133 sucking condensate 141 from the lowest level bottom 124 of the sound line 120 and one of the suction openings 134 sucking condensate 140 from the lowest level bottom of the sound generator 121 and into the exhaust gas line 110. Like in FIG. 2A, the suction line 132 is retained coaxially centered in the sound line by a spacer 125, and the discharge opening 135 of the suction line 132 is disposed inside the exhaust gas line 110 in an coaxially centered manner. The suction opening 133 located closer to the discharge opening 135 is hereby configured with a cross-section being only half of that of the suction opening 134 located, with respect to the suction line 132, further away from the discharge opening 135. Depending on each suction opening's 133, 134 distance to the discharge opening 135 along the suction line 132, it is achieved by this measure that the suction openings 133, 134 provide more or less the same resistance to the negative pressure generated by the Venturi effect and have thus the same negative pressure applied to it.

Figure 2E:
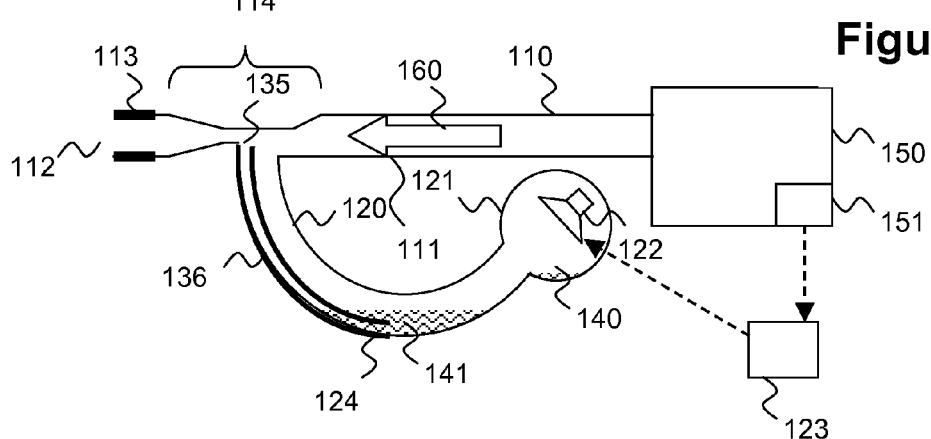
FIG. 2E is a schematic representation and block diagram of a system for modifying exhaust noise from an internal combustion engine propagating through an exhaust system of a vehicle according to a fifth of eight embodiments of the invention.

The embodiment of FIG. 2E differs from the embodiment of FIG. 2B in that the discharge opening 135 of the suction line 136 is flush with a bottom 111 of the exhaust gas line 110, with the suction line 136 thus not extending into the exhaust gas line 110. In the region of the suction line's 136 discharge opening 135, the exhaust gas line 110 is instead provided with a variation 114 of its cross-section forming a Venturi nozzle.

Figure 2F:
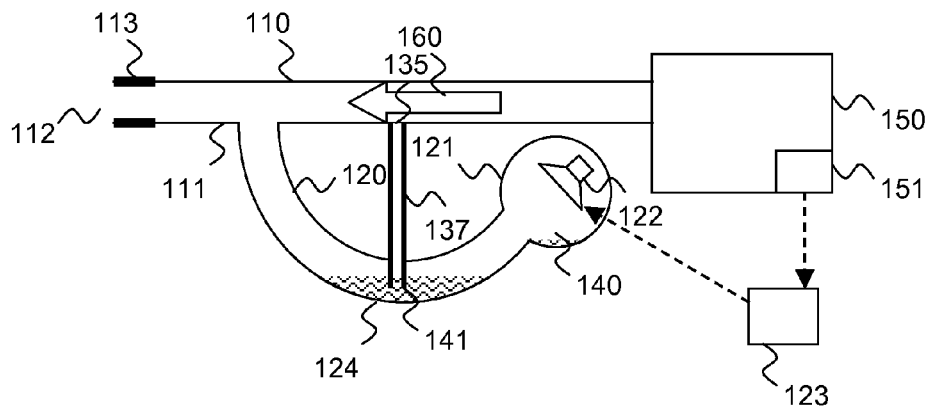
FIG. 2F is a schematic representation and block diagram of a system for modifying exhaust noise from an internal combustion engine propagating through an exhaust system of a vehicle according to a sixth of eight embodiments of the invention.

The embodiment of FIG. 2F differs from the embodiments of FIGS. 2A to 2D firstly in that the discharge opening 135 of the suction line 137 is flush with a bottom 111 of the exhaust gas line 110, with only the exhaust gas 160 passing through the exhaust gas line 110 flowing over it. Thus, the suction line 137 does not extend into the exhaust gas line 110. Furthermore, the suction line 137 is not disposed inside the sound line 120 but penetrates both a wall of the sound line 120, and a wall of the exhaust line 110. In this embodiment, the suction line 137 is made of stainless steel.

Figure 2G:
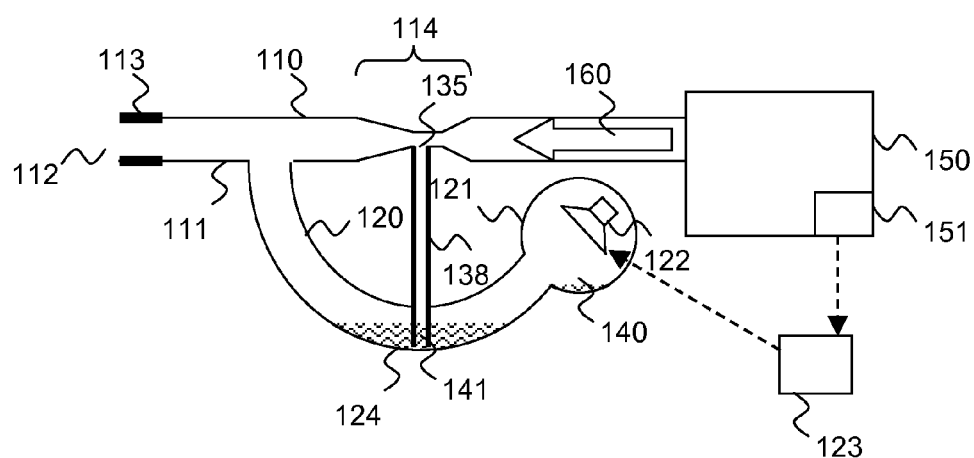
FIG. 2G is a schematic representation and block diagram of a system for modifying exhaust noise from an internal combustion engine propagating through an exhaust system of a vehicle according to a seventh of eight embodiments of the invention.
Figure 2H:
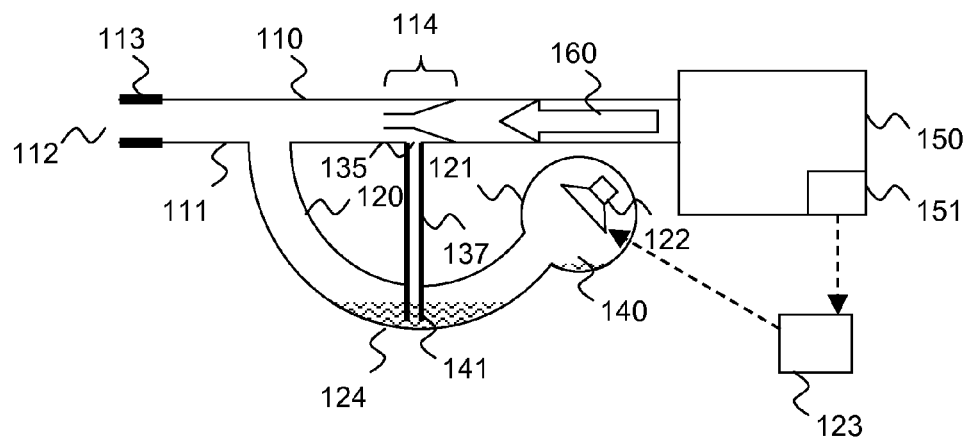
FIG. 2H is a schematic representation and block diagram of a system for modifying exhaust noise from an internal combustion engine propagating through an exhaust system of a vehicle according to an eighth of eight embodiments of the invention.

The embodiments of FIGS. 2G through 2H differ from the embodiment of FIG. 2F in that measures have been taken in the exhaust gas line in the region of the discharge opening 135 of the respective suction line 137, 138 to reduce the cross-section of the exhaust gas line 110 for forming a Venturi structure 114.

According to the embodiment of FIG. 2G, a reduction in the cross-section is achieved by shrinking the diameter of the exhaust gas line 110 itself.

According to the embodiment of FIG. 2H, the reduction in the cross-section is achieved by the exhaust gas line 110 having basically a constant inner diameter but components installed in there reducing the clear cross-section for the exhaust gas 160 flowing there through.

Figure 3:
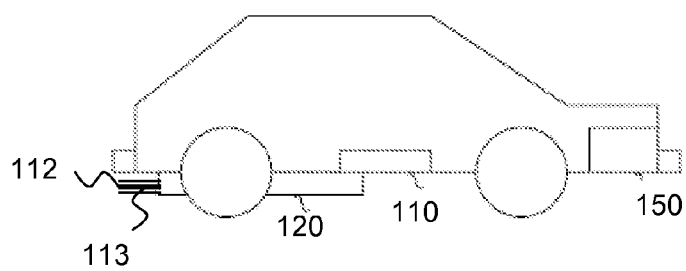
FIG. 3 is a schematic representation of a motor vehicle comprising an exhaust system having a system according to the invention for manipulating exhaust noise propagating through an exhaust system.

The schematic representation of FIG. 3 illustrates a motor vehicle comprising the above exhaust system having a system for removing condensate in addition to an internal combustion engine 150. In FIG. 3, however, only a part of the exhaust gas line 110 and the tailpipe 113 with the discharge opening 112 of the exhaust gas line 110 and a part of the sound line 120 are shown.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims.

While specific embodiments of the invention have been shown and described in detail to illustrate the application of the principles of the invention, it will be understood that the invention may be embodied otherwise without departing from such principles.

What is claimed is:

1. An exhaust system, for a vehicle driven by an internal combustion engine, in which condensate may form, the exhaust system comprising:
a first line section for fluid connection with exhaust gas;
a second line section for fluid connection with exhaust gas; and
a suction line operatively connected between a bottom of the second line section and the first line section, the suction line comprising an opening over which exhaust gas passing in the first line section flows, the suction line forming at least a part of a system for draining condensate,
wherein the second line section comprises a sound generator coupled to a controller for receiving control signals, and configured to generate sound in the second line section, wherein the second line section defines a constant volume.

2. An exhaust system according to claim 1, wherein at least one of:
the first line section comprises a reduced cross-section portion, at a position that the suction line communicates fluidically with the first line section, with a cross-section that is reduced with respect to a cross-section upstream of the position that the suction line communicates fluidically with the first line section; and
the first line section has, at the position that the suction line communicates fluidically with the first line section, a largest diameter that is reduced with respect to a largest diameter upstream of the position that the suction line communicates fluidically with the first line section.

3. An exhaust system according to claim 2, wherein at least one of:
a cross-section of the first line section is, at the position that the suction line communicates fluidically with the first line section, reduced with respect to the cross-section upstream of the position that the suction line communicates fluidically with the first line section by at least 5%; and
the largest diameter of the first line section is, at the position that the suction line communicates fluidically with the first line section, reduced with respect to the largest diameter upstream of the position that the suction line communicates fluidically with the first line section by at least 3%.

4. An exhaust system according to claim 2, wherein at least one of:
the position that the suction line communicates fluidically with the first line section is spaced apart, with respect to a flow direction of the exhaust gas, from a position of the first line section having a larger cross-section than at the position that the suction line communicates fluidically with the first line section by not more than two times the square-root of the cross-sectional area at the position that the suction line communicates fluidically with the first line section; and
the position that the suction line enters the first line section is spaced apart, with respect to the flow direction of the exhaust gas, from a position of the first line section having a larger cross-section than at the position that the suction line communicates fluidically with the first line section by not more than three times the largest diameter of the first line section at the position that the suction line communicates fluidically with the first line section.

5. An exhaust system according to claim 1, wherein at least one of:
the suction line has a cross-section that is not more than 50% of a cross-section of the first line section; and
the suction line has a cross-section that is not more than 50% of a cross-section of the second line section; and
the suction line has a largest diameter that is not more than 33% of the largest diameter of the first line section; and
the suction line has a largest diameter that is not more than 33% of the largest diameter, of the second line section.

6. An exhaust system according to claim 1, wherein the second line section has an end in fluid communication with first line section and a closed dead end to form a non-flow through section, through which exhaust gas does not flow through.

7. An exhaust system according to claim 1, wherein the bottom of the second line section is at least in sections disposed below a bottom of the first line section.

8. An exhaust system according to claim 1, wherein the first line section has one end adapted for a fluid connection with an internal combustion engine, and one end adapted for a fluid connection with an exhaust gas discharge opening.

9. An exhaust system according to claim 1, wherein the suction line comprises the opening over which exhaust gas passing in the first line section flows as a first opening and another opening as a second opening so as to comprise exactly two openings located opposite to each other with respect to a longitudinal extension of the suction line, wherein the first opening is located within a portion of the first line section with exhaust gas flowing though it and the second opening is located at the bottom of the second line section and exhaust gas flows though the suction line between the second opening and the first opening.

10. An exhaust system according to claim 1, wherein the second line section converges into the first line section.

11. A motor vehicle comprising:
an internal combustion engine having an engine control unit; and
an exhaust system comprising:
a first line section for fluid connection with exhaust gas;
a second line section for fluid connection with exhaust gas; and
a suction line operatively connected between a bottom of the second line section and the first line section, the suction line comprising an opening over which exhaust gas passing in the first line section flows, wherein:
one end of the first line section is in fluid communication with the internal combustion engine, and another end of the first line section is in fluid communication with an exhaust gas discharge opening; and
during operation of the internal combustion engine, an internal pressure, caused by the exhaust gas from the internal combustion engine, inside the first line section at a position that the suction line communicates fluidically with the first line section, is reduced with respect to an internal pressure upstream of the position that the suction line communicates fluidically with the first line section,
wherein the second line section comprises a sound generator coupled to a controller for receiving control signals, and configured to generate sound in the second line section, wherein the second line section defines a constant volume.

12. A motor vehicle according to claim 11, wherein the second line section has an end in fluid communication with first line section and a closed dead end to form a non-flow through section, through which exhaust gas does not flow through.

13. A motor vehicle according to claim 11, wherein at least one of:
the first line section comprises a reduced cross-section portion, at a position that the suction line communicates fluidically with the first line section, with a cross-section that is reduced with respect to a cross-section upstream of the position that the suction line communicates fluidically with the first line section; and
the first line section has, at the position that the suction line communicates fluidically with the first line section, a largest diameter that is reduced with respect to a largest diameter upstream of the position that the suction line communicates fluidically with the first line section.

14. A motor vehicle according to claim 13, wherein at least one of:
the position that the suction line communicates fluidically with the first line section is spaced apart, with respect to a flow direction of the exhaust gas, from a position of the first line section having a larger cross-section than at the position that the suction line communicates fluidically with the first line section by not more than two times the square-root of the cross-sectional area at the position that the suction line communicates fluidically with the first line section; and
the position that the suction line enters the first line section is spaced apart, with respect to the flow direction of the exhaust gas, from a position of the first line section having a larger cross-section than at the position that the suction line communicates fluidically with the first line section by not more than three times the largest diameter of the first line section at the position that the suction line communicates fluidically with the first line section.

15. A motor vehicle according to claim 11, wherein the bottom of the second line section is at least in sections disposed below a bottom of the first line section.

16. An exhaust system, for a vehicle driven by an internal combustion engine, in which condensate may form, the exhaust system comprising:
a first line section comprised of an exhaust gas line with at least a portion through which exhaust gas flows;
a second line section defining a constant volume with a closed end to form a non-flow through section, through which exhaust gas does not flow, the second line section being in fluid communication with first line section, the second line section further comprising a sound generator coupled to a controller for receiving control signals, and configured to generate sound in the second line section; and
a suction line operatively connected between the second line section and the first line section, the suction line comprising a suction opening to the first line section over which the exhaust gas flows wherein during operation of the internal combustion engine, an internal pressure inside the first line section, caused by the exhaust gas from the internal combustion engine, at the suction opening, is reduced with respect to an internal pressure upstream of the suction opening.

17. An exhaust system according to claim 16, wherein at least one of:
the first line section comprises a reduced cross-section portion, at or adjacent to the suction opening, with a cross-section that is reduced with respect to a cross-section upstream of the suction opening; and
the first line section has, at or adjacent to the suction opening, a largest diameter that is reduced with respect to a largest diameter upstream of the suction opening.

18. An exhaust system according to claim 17, wherein at least one of:
a cross-section of the first line section is, at or adjacent to the suction opening, reduced with respect to the cross-section upstream of the suction opening by at least 5%; and
the largest diameter of the first line section is, at or adjacent to the suction opening, reduced with respect to the largest diameter upstream of the suction opening by at least 3%.

19. An exhaust system according to claim 17, wherein at least one of:

a position of the suction opening is spaced apart, with respect to a flow direction of the exhaust gas, from a position of the first line section having a larger cross-section than at suction opening by not more than two times the square-root of the cross-sectional area at the suction opening; and the position of the suction opening is spaced apart, with respect to the flow direction of the exhaust gas, from a position of the first line section having a larger cross-section than at the position of the suction opening by not more than three times the largest diameter of the first line section at the position of the suction opening.

20. An exhaust system according to claim 16, wherein:

the sound generator of the second line section comprises a soundproofed enclosure accommodating a loudspeaker;

the second line section further comprises a sound line which couples the sound generated in the sound generator into the interior of the exhaust gas line;

a lowest level bottom section of the sound generator enclosure is located at a higher level than a lowest level bottom section of the sound line with a higher level bottom section located between the lowest level bottom section of the sound generator enclosure and the lowest level bottom section of the sound line;

the lowest level bottom section of the sound line is disposed below a bottom of the first line section;

the suction line extends through at least a portion of the sound line; and another opening of the suction line is arranged at or adjacent to the lowest level bottom of the sound generator.

\* \* \* \* \*